UNITED STATES PATENT OFFICE.

FULTON HENDERSON, OF TOLEDO, OHIO, ASSIGNOR OF ONE-THIRD OF HIS RIGHT TO DRAKE COVERT.

INCRUSTATION-PREVENTIVE.

SPECIFICATION forming part of Letters Patent No. 231,909, dated September 7, 1880.

Application filed April 15, 1880. (No specimens.)

*To all whom it may concern:*

Be it known that I, FULTON HENDERSON, of the city of Toledo, in the county of Lucas and State of Ohio, have invented an Improved Compound for Preventing Incrustation in Boilers; and I do hereby declare the following to be a full, clear, and exact description thereof, which will enable others to make and use the same.

My invention relates to that class of compounds which have for their object the prevention and removal of scale or incrustation in boilers; and it consists of the following ingredients, viz: Eight ounces of red lead, one ounce of linseed-oil, eight pounds of coal-tar. These ingredients are thoroughly mixed together, and are pumped or poured into the boiler when it is cold, and when the same becomes heated the composition will float upon the surface of the water and gradually spread upon the entire inner surface of the boiler, and by the combined action of the ingredients contained in the said composition the formation of scale or incrustation is effectually prevented and scale already formed in the boiler speedily removed.

The composition forms a varnished covering to the interior surface of the boiler and prevents the formation of lime-incrustations or other foreign substances in the water from adhering thereto. It is also a preventive against rust or small leaks in seams or rivet-heads, as the composition effectually closes the same.

Having thus described my invention, I claim as new and useful—

The herein-described incrustation-preventive for boilers, consisting of red lead, linseed-oil, and coal-tar, in the proportions substantially as specified.

In testimony that I claim the foregoing as my own I affix my signature in presence of two witnesses.

FULTON HENDERSON.

Witnesses:
ARION E. WILSON,
EDWARD T. LEWIS.